US008516967B2

(12) United States Patent
Jeffery

(10) Patent No.: US 8,516,967 B2
(45) Date of Patent: Aug. 27, 2013

(54) LAYER CAKE SUPPORT

(76) Inventor: Loraine Elizabeth Jeffery, University Heights, OH (US)

( * ) Notice: Subject to any disclaimer, the term of this patent is extended or adjusted under 35 U.S.C. 154(b) by 1066 days.

(21) Appl. No.: 12/491,299

(22) Filed: Jun. 25, 2009

(65) Prior Publication Data
US 2010/0330240 A1 Dec. 30, 2010

(51) Int. Cl.
*A47B 57/00* (2006.01)
(52) U.S. Cl.
USPC ............................................... 108/101
(58) Field of Classification Search
USPC ............... 108/50.12, 90, 92–94, 101, 139, 108/149–151; 312/125, 135; 211/85.4, 126.2, 211/133.1, 194, 196
See application file for complete search history.

(56) References Cited

U.S. PATENT DOCUMENTS

| | | | |
|---|---|---|---|
| 1,619,818 A | 3/1927 | Gowans | |
| 3,070,236 A | 12/1935 | MacPherson | |
| 2,347,041 A | 4/1944 | Filsinger | |
| 2,902,174 A | 9/1959 | Audsley | |
| 3,115,253 A | 12/1963 | Malbin et al. | |
| 3,169,496 A * | 2/1965 | Muggli et al. | 108/94 |
| 3,236,389 A | 2/1966 | Murdock | |
| 3,464,648 A * | 9/1969 | Fuhriman | 242/139 |
| 3,814,032 A | 6/1974 | McMains | |
| 3,858,529 A | 1/1975 | Salladay | |
| 4,069,772 A | 1/1978 | Haapala | |
| 5,165,637 A * | 11/1992 | Polley et al. | 248/188.4 |
| 5,343,815 A | 9/1994 | Dickinson | |
| D357,160 S | 4/1995 | Fritze | |
| 5,413,801 A * | 5/1995 | McIlwain | 426/420 |
| 5,572,936 A | 11/1996 | Chroniger | |
| 5,617,798 A * | 4/1997 | Lytell | 108/147.19 |
| 6,170,961 B1 | 1/2001 | Knoch | |
| 6,374,755 B1 | 4/2002 | Haase et al. | |
| 6,688,239 B1 | 2/2004 | Pettini et al. | |
| D490,657 S | 6/2004 | McDonald | |
| 7,144,610 B1 * | 12/2006 | Estes et al. | 428/19 |
| 7,287,870 B1 | 10/2007 | Knoch | |
| 2008/0087617 A1 | 4/2008 | Harris | |

FOREIGN PATENT DOCUMENTS
FR 2574648 * 6/1986

* cited by examiner

*Primary Examiner* — Darnell Jayne
*Assistant Examiner* — Matthew Ing
(74) *Attorney, Agent, or Firm* — Anthony M. Del Zoppo, II; Driggs, Hogg, Daugherty & Del Zoppo Co., LPA

(57) ABSTRACT

A layer cake support apparatus includes a base plate configured to receive a first layer of cake, a plurality of cake plates including a material free region and configured to receive a second layer of cake, and a rod which extends substantially vertically through the material free region to the base plate and through first and second layers of cake respectively disposed on the base plate and cake plate. The layer cake support apparatus further includes a plurality of cake supports which extend substantially vertically through a top surface to a bottom surface of the first and second layers of cake. The cake supports are inserted into the first and second layers of cake in locations within the cake layers to minimize interference with the rod.

6 Claims, 2 Drawing Sheets

LAYER CAKE SUPPORT

TECHNICAL FIELD

The following generally relates to a support system for layer cakes.

BACKGROUND

Cake is a form of dessert that is often served at parties, weddings and other celebratory gatherings. One style and/or design for a cake is a tiered cake, which has multiple layers separated by pillars or stanchions. These pillars or stanchions may contain lights or be highly decorated. A layer cake is another style and/or design of a cake consisting of multiple layers that may be held together by frosting, icing or another type of filling, for example, fruit preserves or jams, cream cheese, or ground almonds as in marzipan. However, using frosting, icing or another form of filling to secure cake layers results in an unbalanced and unpredictable formation which may easily collapse or change shape when moved.

Commonly in the field of baking, layer cakes are alternatively supported using flimsy cardboard rounds, which can result in a change of the shape and/or style of the layer cake when the layer cake is shifted. Cardboard rounds additionally provide minimal support and the rounds are easily damaged during construction of the layer cake. Further support methods include separating the cake layers using pillars and/or stands, which raise the cake layers from one another. These support structures may be bulky and expensive and also alter the style and/or design of a layer cake where a baker wishes to create a design with adjacent layers.

SUMMARY OF THE INVENTION

Aspects of the application address the above matters, and others.

In one aspect, a layer cake support apparatus includes a base plate configured to receive a first layer of cake and a plurality of cake plates including a material free region configured to receive a second layer of cake. The layer cake support apparatus further includes a rod which extends substantially vertically through the material free region to the base plate and through the first and second layers of cake disposed on the base plate and cake plate.

In a further aspect, a layer cake support apparatus includes a plurality of cake supports which extend substantially vertically through a top surface to a bottom surface of the first and second layers of cake.

In a further aspect, a plurality of cake supports are inserted into the first and second layers of cake in locations within the cake layers to minimize interference with the rod.

In a further aspect, the base plate, the plurality of cake plates and the rod are composed of a polymer material.

Those skilled in the art will recognize still other aspects of the present application upon reading and understanding the attached description.

DETAILED DESCRIPTION

Figure 1:
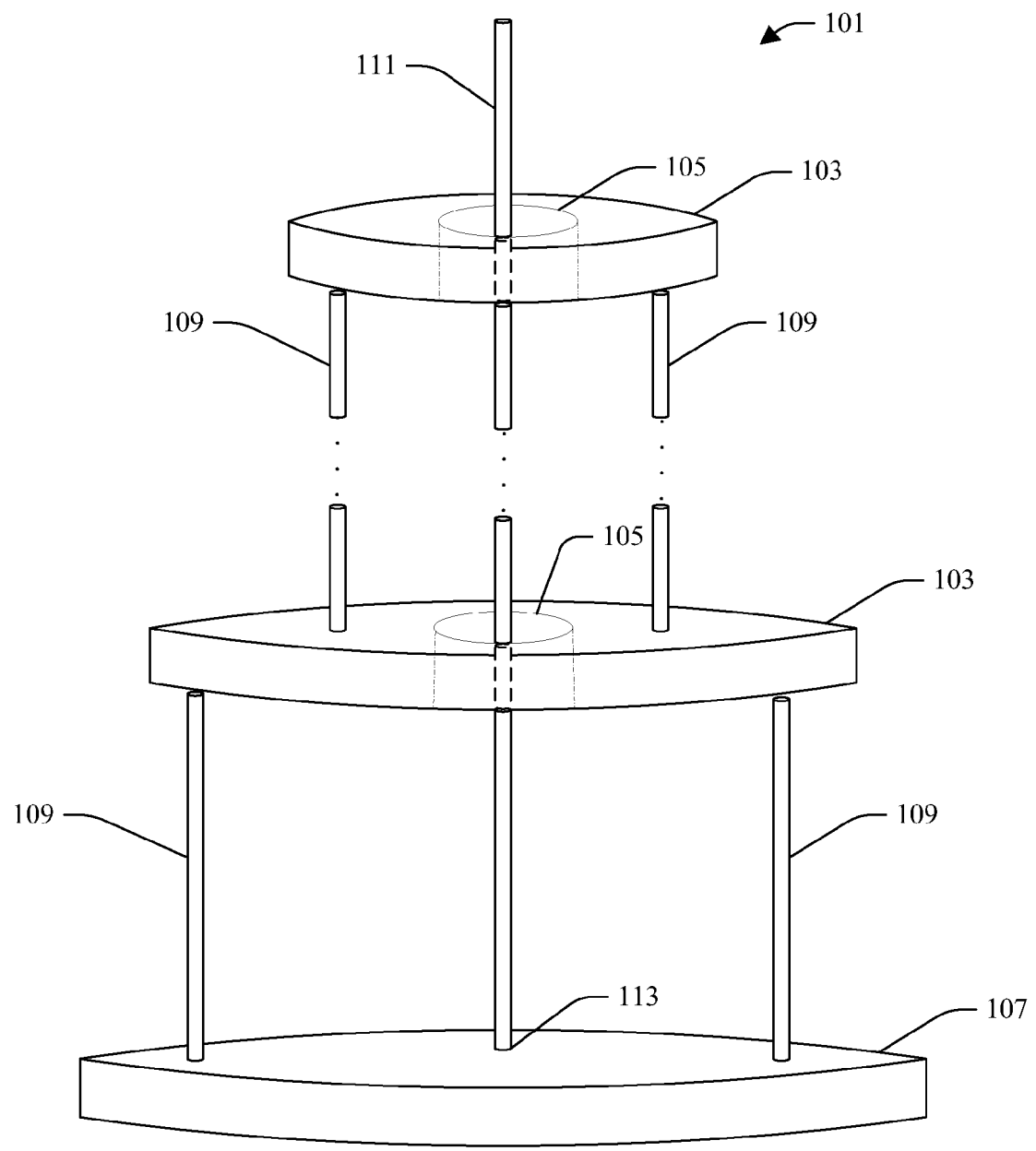
FIG. 1 illustrates an example support system for a layer cake.

FIG. 1 depicts one embodiment for a layer cake support system 101. The support system 101 includes a plurality of plates 103, a bottom plate 107, a plurality of support rods 109 and a stabilizing rod 111. The illustrated plates 103 are circular, disc-like and planar. In other embodiments, the plates 103 may have a planar shape which is not circular, for example, rectangular, square and/or other irregular shapes. Other surfaces are also contemplated for plates 103, for example, a gritted surface or other non-planar surface which minimizes movement upon the plate 103 surface.

In FIG. 1, the plates 103 have differing diameters to produce an ascending-size appearance. However, plates 103 need not be used in this order, but instead may be used in any order, for example, a small diameter plate may be located below a medium diameter plate with the largest diameter plate acting as a base. The plates 103 may be composed of a washable material, for example, a plastic composite or other washable material. The plates 103 may also be comprised of a clear material or a solid-colored material that, for example, may match cake icing or other coating layer.

The plates 103 contain a material free region 105. The inner size and/or dimensions of the material free region allow a tight clearance through which the stabilizing rod 111 passes. Further embodiments may have inner size and/or dimensions for the material free region which are larger, for example, to allow for differing sizes of stabilizing rods 111 or to allow cake layers to be stacked in an irregular fashion. In this instance, the cake layers may have regions which overhand a lower cake layer.

The illustrated bottom plate 107 is also circular, disc-like and planar, and is arranged to rest upon a substantially horizontal surface and acts as a base for the cake support system 101. The bottom plate 107 may include risers which elevate the bottom plate 107 from the horizontal surface, for example, for lifting and moving purposes. Additional embodiments of the bottom plate 107 contemplate planar shapes which are not circular, for example, rectangular, square, polygonal, irregular and/or other shapes.

The support rods 109 provide interstitial support for each layer of a cake. The rods 109, when placed in different substantially vertical locations, create a resting location for one of the plates 103. With the support rods 109 inserted into a layer of cake, the top surface of the cake layer remains a substantially horizontal, level top surface. Each cake layer may contain multiple rods 109, for example, a first layer may use four rods 109 while a second layer uses two or three rods 109. The support rods 109 also provide an additional foundation for the cake layer material. For example, where a cake has a protruding portion or other form which extends beyond the plates 103 or bottom plate 107, the support rods 109 provide a scaffold-like support for the cake substance.

The support rods 109 may have a cylindrical shape or other shape, for example, rectangular or other shape. The support rods 109 may also contain a pointed distal end to allow the support rods 109 to pierce the top surface of a cake layer and travel through the cake layer. The support rods 109 may be manufactured of a reusable material, for example, a composite plastic, a glass, a metal or other washable material. In further embodiments, the support rods 109 may also be composed of a paper material, for example, cardboard, pressed-paper board or wood for disposable use. The stabilizing rod 111 inserts through the material free regions 105 and extends substantially vertically to the bottom plate 107. The stabilizing rod 111 may have a flat end that contacts the bottom plate 107 at location 113. The stabilizing rod 111 may also have a pointed end which can be inserted into an indented region in the bottom plate 107. The stabilizing rod 111 may be composed of a washable material, for example, a reusable plastic, glass or other dishwasher safe material. In further embodiments, the stabilizing rod 111 may be composed of a lightweight metal or other material.

In additional embodiments, a plate holder (not shown) with a substantially horizontal top surface elevates the base plate 107 and/or the plates 103 for decorating the cake layers before constructing the layer cake. The height and/or width dimensions for the plate holder may be based upon the dimensions and/or shape of the base plate 107 and/or the plates 103, for example, where the base plate 107 and the plates 103 are circular, the plate holder may be cylindrical.

Figure 2:
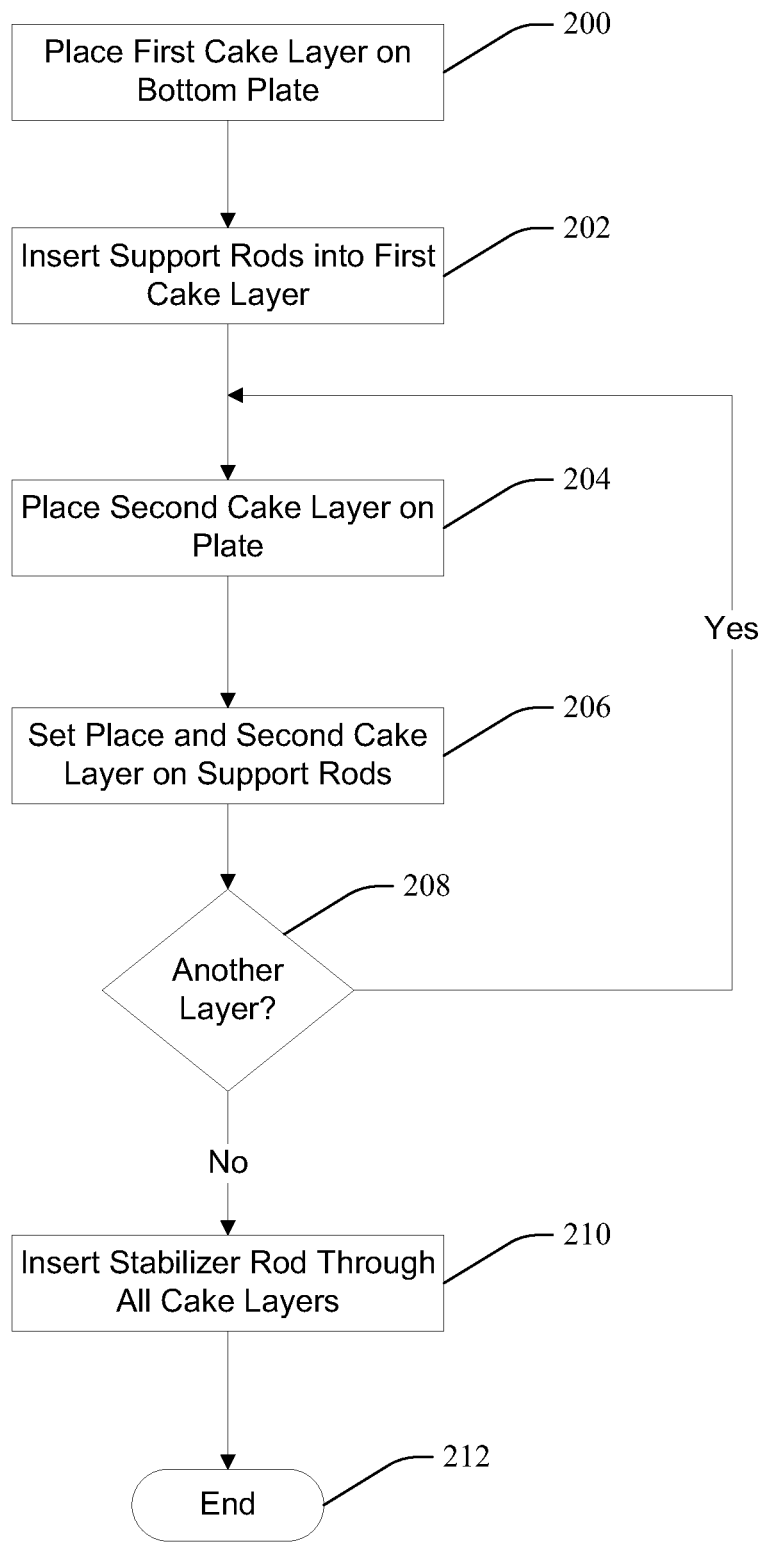
FIG. 2 illustrates one method for using the support system for a layer cake.

FIG. 2 illustrates a method for employing the layer cake support system 101. At 200, a first pre-baked layer of cake is placed upon bottom plate 107. The first cake layer is also iced and/or decorated to allow ease of final decoration once the cake is completed. All additional cake layers are also iced and/or decorated for the same purposes. The cake holder may also be used in this instance, for example, when placing the layer of cake upon the bottom plate 107 and/or for icing the layer of cake, to ensure proper cake layer location and/or minimize decoration errors.

At 202, one or more of the support rods 109 are inserted into the first cake layer at locations throughout the top surface of the cake layer. The support rods 109 are placed so as not to interfere with the center of the cake, e.g., to not interfere with the stabilizing rod 111 once it is inserted into the finished layer cake. A small portion of the rods 109 are left exposed, for example, one centimeter to two centimeters.

At 204, a second pre-baked layer of cake is placed upon a plate 103. The plate 103 containing the second cake layer is placed upon the exposed support rods 109 at 206. The weight of the plate 103 and the second cake layer lowers the support rods 109 into the first cake layer so the rods 109 extend vertically from a top surface of the first layer to a bottom surface, which rests upon the bottom plate 107.

At 208 if another layer of cake is to be added to the layer cake, another set of one or more support rods 109 are inserted into the second cake layer at locations throughout the top surface of the cake layer at 202, with a portion exposed. The next layer of cake is placed upon an additional plate 103 at 204 and set upon the exposed rods 109 at 206.

Otherwise, the stabilizing rod 111 is inserted through the center of the top surface of the second cake layer at 210. The rod 111 then extends through the removed center 105 of plate 103 until the rod 111 contacts the bottom plate 107. The stabilizing rod 111 acts as a scaffold-like support which retains the upright feature of the layer cake.

At 212, the finished layer cake may be iced and/or otherwise decorated.

The application as been described with reference to various embodiments and a method. Modifications and alterations will occur to others upon reading this application. The intent is that the invention be construed to include all such modifications and alterations, including insofar as they come within the scope of the appended claims and the equivalents thereof.

What is claimed is:

1. A layer cake support apparatus, consisting of:
   a base plate configured to receive a first layer of cake wherein a geometry of the base plate is planar with opposing major surfaces with no protrusions that are parts of major surfaces extending from the opposing major surfaces;
   at least one cake plate including a material free region and configured to receive a second layer of cake, wherein a geometry of the at least one cake plate is planar with opposing major surfaces with no protrusions that are parts of the major surfaces extending from the opposing major surfaces;
   wherein the base and cake plates are spaced apart from each other and do not include portions that are in physical contact with each other; and
   a single unitary rod which extends substantially vertically through the material free region to the base plate and through first and second layers of cake respectively disposed on the base plate and cake plate, wherein rod does not include subunits connect together to form the rod and the rod is not directly connected to the at least one cake plate.

2. The apparatus of claim 1, wherein the base plate, the at least one cake plate and the rod are composed of a polymer material.

3. A layer cake support apparatus, consisting of:
   a base plate configured to receive a first layer of cake, wherein a geometry of the base plate is planar with opposing major surfaces with no protusions that are parts of the major surfaces extending from the opposing major surfaces;
   at least one cake plate including a material free region and configured to receive a second layer of cake, wherein a geometry of the at least one cake plate is planar with opposing major surfaces with no protrusions that are parts of the major surfaces extending from the opposing major surfaces,
   wherein the base and cake plates are spaced apart from each other and do not include portions that are in physical contact with eachother;
   at least one cake support, which extends substantially vertically through the first and second layers of cake from a top surface of the at least one cake layer to a bottom surface of the cake layers; and
   a rod, which extends substantially vertically through a center region of the material free region to the base plate and through first and second layers of cake respectively disposed on the base plate and cake plate, wherein rod does not include subunits connected together to form the rod and the rod is not directly connected to the at least one cake plate.

4. The apparatus of claim 3, wherein the rod contacts the base plate in a center location.

5. The apparatus of claim 3, wherein the rod maintains the position of the at least one cake plate containing the second cake layer and the base plate containing the first cake layer.

6. The apparatus of claim 3, wherein the rod is manufactured of a polymer material.

* * * * *